United States Patent
Yoshinari et al.

[11] Patent Number: 6,111,849
[45] Date of Patent: Aug. 29, 2000

[54] PHASE CHANGE OPTICAL RECORDING MEDIUM, METHOD OF OVERWRITING SAME AND RECORDING SYSTEM FOR THE OVERWRITING

[75] Inventors: Jiro Yoshinari; Masanori Kosuda; Hiroshi Shingai; Takashi Kikukawa, all of Nagano, Japan

[73] Assignee: TDK Corporation, Tokyo, Japan

[21] Appl. No.: 09/163,605

[22] Filed: Sep. 30, 1998

[30] Foreign Application Priority Data

Oct. 1, 1997 [JP] Japan ................... 9-284445
Aug. 18, 1998 [JP] Japan ................... 10-247812

[51] Int. Cl.⁷ .................. G11B 7/24; B32B 3/00
[52] U.S. Cl. .................. 369/275.2; 369/288; 428/64.1
[58] Field of Search ................ 369/13, 288, 275.2, 369/275.1, 283, 284, 275.3, 275.4; 428/64.1, 64.2; 430/270.13, 21, 945

[56] References Cited

U.S. PATENT DOCUMENTS

| | | | |
|---|---|---|---|
| 5,063,097 | 11/1991 | Hirota et al. | 428/64.6 |
| 5,362,538 | 11/1994 | Ohbayashi et al. | 428/64.5 |
| 5,527,661 | 6/1996 | Akahira et al. | 430/270.13 |
| 5,637,372 | 6/1997 | Tominaga et al. | 428/64.1 |

FOREIGN PATENT DOCUMENTS 5-159369  6/1993  Japan.

*Primary Examiner*—Ali Neyzari
*Attorney, Agent, or Firm*—Oblon, Spivak, McClelland, Maier & Neustadt, P.C.

[57] ABSTRACT

An optical recording medium comprising a substrate, at least one dielectric layer and a phase change type recording layer. In overwriting, the recording medium should satisfy the condition $V_{OW}/V_{OP}<1$, preferably $0.5 \leq V_{OW}/V_{OP}<0.95$, where $V_{OP}$ is the optimum linear velocity and $V_{OW}$ is a linear velocity for overwriting. This enables the erasability of recorded marks on the medium to be at least 26 dB after the recording medium with the recorded marks has been stored for at least 100 hours at 60 to 80° C.

9 Claims, 2 Drawing Sheets

3T

11T

PHASE CHANGE OPTICAL RECORDING MEDIUM, METHOD OF OVERWRITING SAME AND RECORDING SYSTEM FOR THE OVERWRITING

BACKGROUND OF THE INVENTION

The present invention relates to a phase change type optical recording medium, and a method of overwriting the same, and a recording system used for such overwriting.

Highlight is recently focused on optical recording media capable of recording information at a high density and erasing the recorded information for rewriting or overwriting. One typical rewritable optical recording medium is of the phase change type wherein the recording layer is irradiated with a laser beam to change its crystallographic state whereupon a change of reflectance by the crystallographic change is detected for reproducing. Optical recording media of the phase change type are of great interest since the optical system of the drive unit used for their operation is simpler than that for magneto-optical recording media.

Most optical recording media of the phase change type use Ge—Sb—Te base or chalcogenide materials which provide a substantial difference in reflectance between crystalline and amorphous states and have a relatively stable amorphous state.

When information is recorded on a phase change type optical recording medium, the recording layer is irradiated with a laser beam of power (recording power) high enough to bring the recording layer to a temperature higher than the melting point thereof. The recording layer is melted at spots with the recording power applied thereon, and then quickly cooled so that recorded marks of amorphous state can be formed. When the recorded marks are erased, on the other hand, the recording layer is irradiated with a laser beam having such a relatively low power (erase power) as to bring the temperature of the recording layer to a temperature higher than the crystallization temperature thereof but lower than the melting point thereof. The recorded marks with the erase power applied thereon go back to the crystalline state because they are slowly cooled down after heated to the temperature higher than their crystallization temperature. With the phase change type optical recording medium, it is thus possible to modulate the intensity of a single light beam for overwriting.

As a result of the inventors' studies, however, it has been found that in a phase change type optical recording medium comprising a recording layer based on Ge—Sb—Te compositions, initially formed recorded marks cannot fully be erased after the optical recording medium is stored for at least about 100 hours at high temperatures while the recorded marks remain formed on the recording layer. This is true of even the case where the recorded marks are overwritten. A failure in erasing the former recorded marks represents an error in the absence of post-recording check. When two overwriting cycles takes place continuously without allowing the recording medium to be stored at high temperatures, i.e., when the recording layer is irradiated twice with a laser beam having a power level greater than that of erase power, the recorded marks can fully be erased. It is thus possible to avoid such an error by check after overwriting, and rewriting. However, this offers a problem that much time is needed for writing.

Prevention of degradation of a phase change type optical recording medium due to storage in a high-temperature environment is typically proposed in JP-A 5-159369. The publication alleges that a dielectric layer, which is to be provided on a substrate together with a recording layer, is made up of a composite material comprising a chalcogenide compound, oxygen and carbon (C), whereby internal stresses occurring in the dielectric layer are so reduced that an adhesive force between the dielectric layer and the recording layer can be increased, with the result that reliability is maintained over a long period of time with neither delamination or nor cracking. Thus, the publication says nothing about an erasability drop found after storage at high temperatures, and about how it is avoidable.

SUMMARY OF THE INVENTION

A main object of the invention is to provide a phase change type optical recording medium which is improved in terms of write-once read multiple properties after storage in a high-temperature environment, and a specific object of the invention is to prevent any erasability drop that may otherwise occur at the first recording cycle after storage at high temperatures.

Such objects are achieved by the inventions defined below as (1) to (9).

(1) An optical recording medium comprising a phase change type recording layer on a substrate, wherein:

after said optical recording medium is stored for at least 100 hours at a temperature lower than a highest temperature at which said optical recording medium is used or kept while a recorded mark remains formed on said recording layer, an erasability of said recorded mark is at least 26 dB when said recorded mark is overwritten.

(2) The optical recording medium according to (1), wherein said highest temperature is 60 to 80° C.

(3) The optical recording medium according to (1) or (2), wherein overwriting takes place at a linear velocity $v_{OW}$ that satisfies $$v_{OW}/v_{OP} < 1$$

where $v_{OP}$ is an optimum linear velocity.

(4) The optical recording medium according to (3), which satisfies $$0.5 \leq v_{OW}/v_{OP} \leq 0.95$$

(5) The optical recording medium according to any one of (1) to (4), wherein said recording layer contains germanium, antimony and tellurium as main components.

(6) A recording method for overwriting an optical recording medium comprising a phase change type recording layer on a substrate, which satisfies $$v_{OW}/v_{OP} < 1$$

wherein $v_{OP}$ is an optimum linear velocity, and $v_{OW}$ is a linear velocity for overwriting.

(7) The recording method according to (6), wherein $$0.5 \leq v_{OW}/v_{OP} \leq 0.95$$

(8) The recording method according to (6) or (7), wherein said recording layer contains germanium, antimony and tellurium as main components.

(9) A recording system for an optical recording medium, wherein recording is carried out by the recording method according to any one of (6) to (8).

As already stated, the inventors have found that in a conventional phase change type recording medium, recorded marks initially formed on the recording layer cannot fully be erased when the recording medium is overwritten by erasing the recorded marks and forming again such recorded marks after it has been stored for at least about 100 hours at high temperatures.

A close study of this phenomenon has indicated that the optimum linear velocity of an optical recording medium slows down due to storage at high temperatures. In this case, the "optimum linear velocity" is understood to mean a linear velocity at which the jitters reach a minimum. For instance, when the optimum linear velocity of 7 m/s is obtained before storage, the erasability goes down to 18 dB at one post-storage overwriting cycle. This erasability is insufficient because the erasability should generally be 26 dB or greater. After storage, this recording medium is found to have an optimum linear velocity of 6 m/s. If overwriting takes place at a linear velocity of 6 m/s after storage, a sufficient erasability of 30 dB is then obtainable. When two overwriting cycles take place at the optimum linear velocity of 7 m/s after storage, a sufficient erasability of 29 dB is again obtainable.

In an optical recording system, an associated optical recording medium is designed such that the optimum linear velocity thereof is in substantial agreement with the linear velocity of a driving device. Unless the optical recording medium is designed such that its erase power margin becomes extremely wide, no sufficient reliability is obtained because of an erasability reduction after storage at high temperatures.

In the present invention, however, overwriting can take place at a linear velocity slower than the optimum linear velocity. Stated otherwise, overwriting can take place at the optimum linear velocity after storage at high temperatures or at a linear velocity in the vicinity thereof. For this reason, it is possible to achieve a high-reliability optical recording medium free from any erasability drop due to the first overwriting cycle after storage at high temperatures. More specifically, even when the optical recording medium is stored for at least 100 hours at a temperature (usually 60° C. to 80° C. inclusive) lower than the highest temperature at which it is used or kept, an erasability of at least 26 dB is achievable. It is to be noted that the shorter the recorded marks to be overwritten, the better the erasability is. When overwriting takes place at the optimum linear velocity, however, the erasability after storage at high temperatures goes down to less than 26 dB, and this is true of even the case where the recorded marks formed upon overwriting have a minimum turnover space. If the recording medium is overwritten with recorded marks having a minimum turnover space at a linear velocity slower than the optimum linear velocity according to the invention, on the other hand, it is then possible to obtain an erasability of at least 26 dB.

Since, in the invention, the optimum linear velocity of the medium should be higher than the linear velocity of a medium driving device, it is required for the recording layer to have a gradually cooled structure or a relatively high crystallization speed. For such a gradually cooled structure, a large thickness may be provided to the recording layer or a dielectric layer (the second dielectric layer 32 in FIG. 3) interleaved between the recording layer and the reflective layer. The crystallization speed may be regulated by control of the composition of the recording layer. The crystallization speed may also be increased by control of the composition of the first dielectric layer 31 or the second dielectric layer 32 in FIG. 3).

EXPLANATION OF THE PREFERRED EMBODIMENTS

Some preferable embodiments of the invention will now be explained in detail.

Recording Process

In the present invention, overwriting can take place at a linear velocity slower than the optimum linear velocity of an optical recording medium on which information or data are to be recorded. Specific ratios of the linear velocity $v_{OW}$ for overwriting with respect to the optimum linear velocity $v_{OP}$ may be appropriately determined depending on various conditions such as the erase power margin of the optical recording medium because they vary with those conditions.

However, it is preferable that $$0.5 \leq v_{OW}/v_{OP} \leq 0.95$$

More preferably, $$0.7 \leq v_{OW}/v_{OP} \leq 0.95$$

When the ratio $v_{OW}/v_{OP}$ is too small, the recording medium is hardly recorded unless it is stored at high temperatures. When the ratio $v_{OW}/v_{OP}$ is too large, no sufficient erasability is obtained after storage at high temperatures.

By the term "optimum linear velocity" used herein is intended a linear velocity at which the jitters reach a minimum. Since the optimum linear velocity varies upon storage at high temperatures as already mentioned, a medium used for the measurement of the jitters should not be stored at high temperatures. The jitters may be measured in conventional manners. However, it is to be noted that even a medium stored at high temperature may be used for the measurement of the optimum linear velocity if it is continuously overwritten at least twice before measurement.

Modulation patterns for laser beams used for overwriting in the invention are not particularly critical. However, preference is given to such modulation patterns as explained below.

Figure 1:
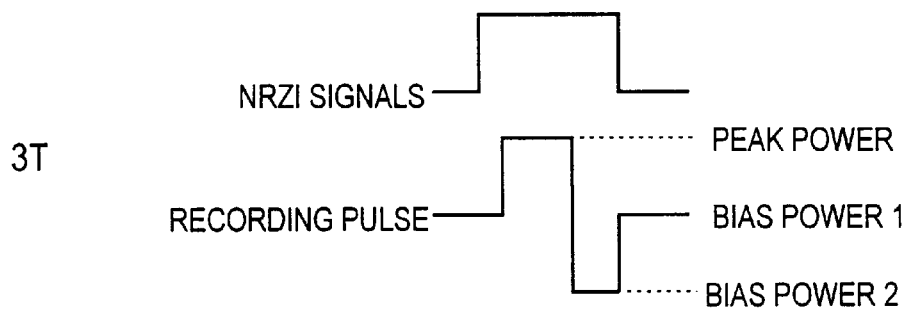
FIG. 1 is a graph illustrative of one modulation pattern for the laser beam used for the overwriting of the optical recording medium according to the invention.
Figure 2:
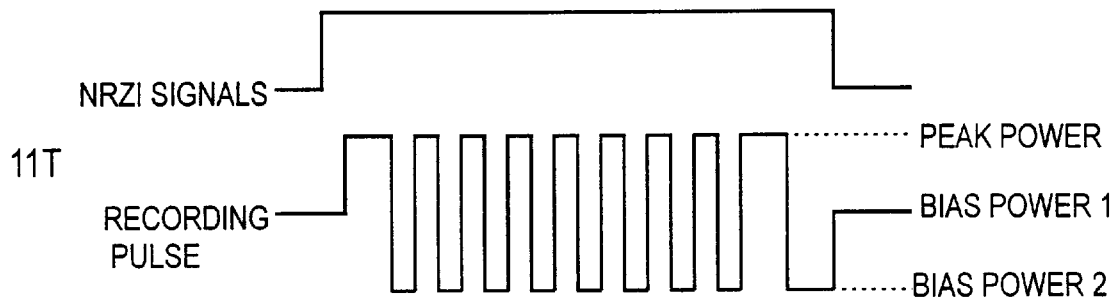
FIG. 2 is a graph illustrative of another modulation pattern for the laser beam used for the overwriting of the optical recording medium according to the invention.

Modulation patterns for the laser beam preferably used herein are shown in FIGS. 1 and 2. FIG. 1 illustrates a modulation pattern (recording pulse pattern) for the recording of 3 T signals while FIG. 2 illustrates a modulation pattern for the recording of 11 T signals, each with time as abscissa and the power level of the laser beam as ordinate. NRZI signal patterns for 3 T and 11 T are also shown in FIGS. 1 and 2.

In each modulation pattern, the power level involves three stages, i.e., $P_P$ (peak power), $P_{B1}$ (bias power 1) that is lower than $P_P$, and $P_{B2}$ (bias power 2) that is lower than $P_{B1}$. The pulse modulation of recording power has so far been available in the art. In this case, however, the bottom value of a recording pulse is $P_{B1}$ that is erase power. The modulation pattern used herein is characterized in that a recording pulse has a peak value $P_P$ and a bottom value $P_{B2}$, and once the power level goes down to the bottom value $P_{B2}$ after the final pulse irradiation, it goes back to $P_{B1}$ that is the erase power level. By allowing the recording pulse to have such a pattern, it is possible to reduce an increase in the jitters because the shape of recorded marks is less susceptible to distortion even at an increased recording density.

The linear velocity for overwriting is usually of the order of 0.8 to 20 m/s, and preferably 1.2 to 16 m/s, although the present invention is not limited thereto.

Architecture of Medium

Figure 3:
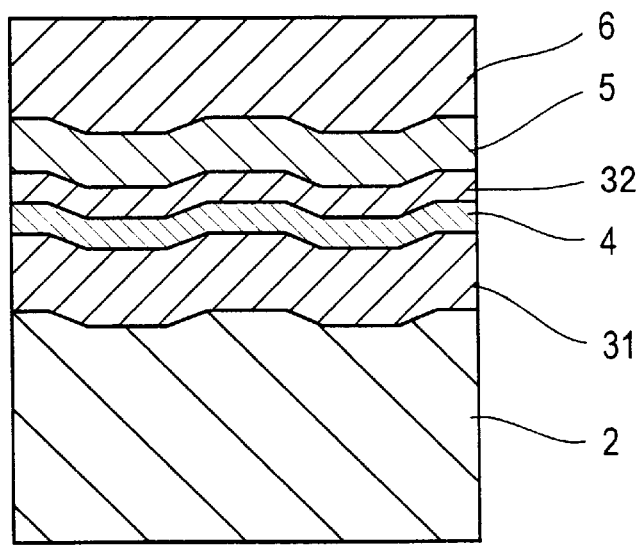
FIG. 3 is a partial cross-sectional view of one embodiment of the optical recording medium according to the invention.

A typical architecture of the optical recording medium according to the invention is shown in FIG. 3. As shown, the optical recording medium is of a single-sided (single substrate) recording type medium that comprises a substrate 2 provided with, in order from its surface side, a first dielectric layer 31, a recording layer 4, a second dielectric layer 32, a reflective layer 5 and a protective layer 6. It is here to be noted that the present invention may be applied not only to a double-sided recording type medium comprising two such single-sided recording type media bonded together at the protective layers 6, using an adhesive layer, but also to a medium comprising the single-sided recording type medium bonded to a protective substrate, using an adhesive layer.

Substrate

In the optical recording medium of the invention, the recording layer 4 is irradiated through the substrate 2 with a light beam. It is therefore preferable that the substrate 2 is constructed of a material substantially transparent to the light beam used, for instance, a resinous or glass material. For the resin, it is preferable to use acrylic resin, polycarbonate, epoxy resin, polyolefin or the like. The shape and size of the substrate are not critical to the practice of the invention, although the substrate is generally of disk shape having a thickness of about 0.5 to 3 mm and a diameter of about 50 to 360 mm. If required, the substrate may be provided on its surface with a grooved or other shaped pattern for tracking, and addressing purposes.

First Dielectric Layer 31 & Second Dielectric Layer 32

The first dielectric layer 31 is provided to prevent oxidation of the recording layer, and protect the substrate by cutting off heat that may otherwise be conducted from the recording layer to the substrate during recording. The second dielectric layer 32 is provided to protect the recording layer, and control a release of a remanent heat after the completion of recording. Both the dielectric layers also contribute to an improvement in the degree of modulation.

Each dielectric layer may be constructed of any desired dielectric material selected from various dielectric materials such as various oxides, nitrides, sulfides and carbides, and mixtures or solid solutions thereof. Since it is required for the invention that the optimum linear velocity of the medium be relatively fast as already mentioned, it is preferable that an appropriate selection is made from dielectric materials that render such design easy. In a preferable embodiment, a dielectric layer made up of silicon oxide, silicon nitride and/or germanium nitride, a mixture of zinc sulfide and silicon oxide or the like is provided contiguously to the recording layer so as to accelerate the crystallization of the recording layer. Of these materials, it is general that the mixture of zinc sulfide (ZnS) and silicon oxide ($SiO_2$) has a main composition of 85 mol % ZnS and 15 mol % $SiO_2$. In order to make the crystallization speed fast, however, it is preferable to make the content of silicon oxide higher than usual, for instance, higher than about 40 mol %.

In the present disclosure, the content of silicon oxide is found by $SiO_2/(ZnS+SiO_2)$ with the proviso that zinc sulfide and silicon oxide are calculated as ZnS and $SiO_2$, respectively. Stated otherwise, the content of silicon oxide should be determined on the basis of the amounts of S, Zn and Si found as by fluorescent x-ray analysis. In this regard, for instance, when Zn is in excess of S or S is in excess of Zn, the content of ZnS should be calculated in conformity with the lesser of Zn and S on the premise that excessive Zn or S is present in the form of other compounds (ZnO, etc.) or in a free state.

Each dielectric layer may have either a single layer structure or a multilayer structure.

The first dielectric layer 31 has a thickness of preferably 30 to 300 nm, and more preferably 50 to 250 nm. By allowing the first dielectric layer to have such a thickness, it is possible to achieve effective prevention of damage to the substrate during recording, with an increase in the degree of modulation.

The second dielectric layer 32 has a thickness of 10 to 50 nm, and preferably 13 to 35 nm. By permitting the second dielectric layer to have such a thickness, the edges of recorded marks are so clearly delimited that the jitters can be minimized, because a fast cooling rate can be achieved. Such a thickness also contributes to an increase in the degree of modulation.

Of the dielectric layers, the ZnS-containing one preferably includes a metal element A that has a standard free energy for the formation of a sulfide thereof lower than a standard free energy for the formation of ZnS at 0 to 1,000° C. By incorporating the metal element A in the dielectric layer, it is possible to prevent S or Zn release from the dielectric layer upon repeated overwriting cycles, thereby preventing an increase in the jitters. This can in turn result in an increase in the number of overwritable cycles.

For the metal element A, it is preferable to use at least one element selected from the group consisting of Ce, Ca, Mg, Sr, Ba, and Na, with Ce being most preferable because of its low standard free energy for the formation of its sulfide. At 300° K., for instance, the standard free energy is ca. −230 kJ/mol for the formation of ZnS, ca. −540 kJ/mol for the formation of CeS, ca. −510 kJ/mol for the formation of CaS, ca. −390 kJ/mol for the formation of MgS, ca. −500 kJ/mol for the formation of SrS, ca. −460 kJ/mol for the formation of BaS, and ca. −400 kJ/mol for the formation of $Na_2S$.

In the dielectric layer, the ratio of the metal element A to all metal elements is less than 2 at %, preferably up to 1.5 at %, and more preferably up to 1.3 at %. Too much metal element A is substantially ineffective for prevention of jitter increases upon repeated overwriting cycles. To make full advantage of the metal element A added, it is preferred that the proportion of the metal element A is particularly at least 0.01 at %, and more particularly at least 0.03 at %. The ratio of the metal element A to all metal elements may be determined by fluorescent x-ray analysis, EPMA (electron probe x-ray microanalysis), or the like. In the present disclosure, all metals in the dielectric layer are understood to include metalloids such as Si.

In the dielectric layer, the metal element A may be present in the form of any of a single substance, sulfide, oxide, fluoride, etc.

While an account has been given of a specific embodiment wherein the dielectric layer contains the metal element A, it is understood that an intermediate layer containing the metal element A may be interleaved between the dielectric layer and the recording layer. Such an intermediate layer, for instance, may be made up of cerium oxide ($CeO_2$) alone or a ZnS—$CeO_2$ mixture.

Each dielectric layer is preferably formed by vapor deposition such as sputtering, and evaporation, with sputtering being most preferred.

The incorporation of the metal element A in the dielectric layer may be achieved by various processes. When, for instance, Ce is used as the metal element A, the target used may comprise a major target providing a major component of the dielectric layer, on which a chip composed of Ce alone or $CeO_2$ is placed. Alternatively, $CeO_2$ or other Ce compound may be incorporated in the major target. In another target embodiment wherein Ca or Mg is used as the metal element A, a chip composed of CaO or MgO may be placed on the aforesaid major target to form a target body. However, this embodiment is not preferable because of the deliquescence of such compounds. Preferably in this case, therefore, a chip composed of $CaF_2$ or $MgF_2$ is placed on the major target to form a target body. When Sr, Ba or Na is used as the metal element A, too, it is preferable to use a fluoride chip rather than an oxide chip in view of deliquescence. Ca, Mg, Sr, Ba, and Na may be incorporated in the major target in the form of an oxide or other compound. It is noted that a composite target such as $ZnS$—$SiO_2$ may be used for the major target, or use may be made of a multi-target sputtering process wherein ZnS, and $SiO_2$ are independently used as the major target.

Usually, sputtering takes place in an argon atmosphere, but it is preferable to carry out sputtering in an $Ar/O_2$ mixed atmosphere. The introduction of $O_2$ at the time of sputtering is particularly effective for carrying out sputtering while a chip composed of the metal element A alone is placed on the major target. This is also effective for the cases where a chip composed of a compound of the metal element A is placed on the major target, and a compound of the metal element A is incorporated in the major target. When the amount of $O_2$ incorporated in the sputtering atmosphere is represented by a flow ratio $O_2/(Ar+O_2)$, it is preferable that the flow ratio is particularly up to 30%, and more particularly up to 25%. The incorporation of too much $O_2$ is not preferable although it is possible to lower recording power. This is because the erase power margin becomes extremely narrow due to the erase power remaining unchanged. It is here noted that in order to make full advantage of the incorporation of $O_2$, the aforesaid flow ratio is preferably at least 5%, and more preferably at least 10%.

Recording Layer 4

The composition of the recording layer is not critical to the practice of the present invention. However, it is understood that the present invention is very effective for optical recording media having recording layers based on Ge—Sb—Te and In—Ag—Te—Sb compositions, especially Ge—Sb—Te compositions, as explained below.

In the present invention, the atomic ratio between elements constituting a recording layer based on the Ge—Sb—Te composition is given by formula I:

$$Ge_aSb_bTe_{1-a-b} \quad (I)$$

Here it is preferable that $0.08 \leq a \leq 0.25$ $0.20 \leq b \leq 0.40$

When the value of a in formula I is too small, recorded marks are less susceptible to crystallization, resulting in an erasability drop. When the value of a is too large, much Te is bonded to Ge with the result that Sb is crystallized out, making the formation of recorded marks difficult.

When the value of b in formula I is too small, the amount of Te becomes too much during storage at high temperatures to achieve reliability, because recorded marks are susceptible to crystallization. When the value of b is too large, it is difficult to form recorded marks because of the crystallization of Sb.

The recording layer based on this composition has a thickness of preferably 10 to 50 nm. When the recording layer is too thin, the growth of a crystal phase becomes difficult, and so a reflectance change incidental to a phase change becomes insufficient. When the recording layer is too thick, on the other hand, there are drops of both reflectance and the degree of modulation.

In the present invention, the atomic ratio between elements constituting a recording layer based on the In—Ag—Te—Sb composition is given by formula II:

$$[(In_aAg_bTe_{1-a-b})_{1-c}Sb_c]_{1-d}M_d \quad (II)$$

Here it is preferred that a=0.1 to 0.3 b=0.1 to 0.3 c=0.5 to 0.8 d=0 to 0.10

It is more preferable that a=0.11 to 0.28 b=0.15 to 0.28 c=0.55 to 0.78 d=0.005 to 0.05

When the value of a in formula II is too small, the In content of the recording layer becomes relatively too low. This in turn makes the amorphism of recorded marks insufficient, resulting in a drop of the degree of modulation, and a reliability drop as well. At too large a value of a, on the other hand, the In content of the recording layer becomes relatively too high. This in turn makes the reflectance of areas other than the recorded marks low, resulting in a drop of the degree of modulation.

When the value of b in formula II is too small, the Ag content of the recording layer becomes relatively too low. This in turn makes the recrystallization of recorded marks difficult and so renders repeated overwriting difficult. At too large a value of b, on the other hand, the Ag content of the recording layer becomes relatively high, and so excessive Ag diffuses independently into an Sb phase at the time of recording or erasing. This in turn makes the robustness of the recording layer upon rewriting low, and renders the stability of both recorded marks and crystalline portions low, resulting a reliability drop. In other words, the crystallization of the recorded marks is promoted during storage at high temperatures, often resulting in drops of C/N and the degree of modulation. Repetition of recording may often facilitate deterioration in C/N and the degree of modulation.

When the value of a+b is too small, a Te phase is formed by excessive Te. The Te phase makes erasing difficult because it slows down the rate of crystal transition. When the value of a+b is too large, on the other hand, it is difficult to make the recording layer amorphous, leading to a possibility that signals may not be recorded.

When the value of c in formula II is too small, there is an increased reflectance difference concomitant with a phase change, but difficulty is involved in erasing because of an abrupt crystal transition rate drop. At too large a value of c, on the other hand, the degree of modulation becomes low due to a decreased reflectance difference incidental to the phase change.

In formula II, M represents at least one element selected from the group consisting of H, Si, C, V, W, Ta, Zn, Ti, Ce, Tb, Ge, Sn, Pb, and Y. The element M is effective for improving rewriting robustness, more specifically reducing the drop of erasability due to repeated rewriting, and contributes to a reliability improvement under unfavorable conditions, e.g., high temperature and humidity conditions. Of these elements, it is preferable to use at least one of V, Ta, Ce, Ge and Y because their such effects are strong. Particular preference is given to at least one of V and Ta, with V being most preferred.

When the value of d representing the content of the element M is too large, no sufficient degree of modulation is obtainable because of a decreased reflectance difference concomitant with a phase change. When the value of d is too small, the effect of the element M added becomes slender.

It is preferred that the recording layer based on this composition consists essentially of Ag, Sb, Te and In, and the element or elements M added if required. In the practice of the invention, however, it is acceptable that Ag may be partially replaced by Au, Sb may be partially replaced by Bi, Te may be partially replaced by Se, and In may be partially replaced by Al and/or P.

The percent replacement of Ag by Au is preferably up to 50 at %, and more preferably up to 20 at %. At too high a percent replacement, recorded marks are susceptible to crystallization, leading to a reliability drop at high temperatures.

The percent replacement of Sb by Bi is preferably up to 50 at %, and more preferably up to 20 at %. Too high a percent replacement causes the recording layer to have an increased coefficient of absorption, resulting in a reduction of the interference effect of light. This in turn makes the reflectance difference between crystalline and amorphous portions and hence the degree of modulation low, so failing to obtain high C/N.

The percent replacement of Te by Se is preferably up to 50 at %, and more particularly up to 20 at %. Too high a percent replacement causes the rate of crystal transition to become too low to obtain any sufficient erasability.

The percent replacement of In by Al and/or P is preferably up to 40 at %, and more preferably up to 20 at %. Too high a percent replacement causes the stability of recorded marks to become low with a reliability drop. It is noted that Al and P may be used at any desired proportion.

The recording layer based on the aforesaid composition has a thickness of preferably 9.5 to 50 nm, and more preferably 10 to 30 nm. Too thin a recording layer makes the growth of a crystal phase difficult, and so renders a reflectance change incidental to a phase change insufficient. Too thick a recording layer, on the other hand, causes a large amount of Ag to diffuse in the recording layer in a thickness direction thereof during the formation of recorded marks. This in turn makes the proportion of Ag diffusing in a longitudinal direction of the recording layer low, resulting in a drop of the reliability of the recording layer. Too thick a recording layer gives rise to drops of both reflectance and the degree of modulation.

The composition of the recording layer may be determined by EPMA, x-ray microanalysis, ICP, or the like.

Preferably, the recording layer is formed by sputtering. Sputtering conditions are not critical to the practice of the invention. For instance, an alloy target or a multi-target sputtering process with a plurality of targets may be used for the sputtering of a material comprising a plurality of elements.

Reflective Layer 5

The reflective layer may be formed of any desired material, usually any of high-reflectance metals or alloys of such metals, for instance, Al, Au, Ag, Pt, Cu, Ni, Cr, and Ti, and has preferably a thickness of 30 to 300 nm. At a thickness less than the lower limit of this range, it is difficult to obtain any sufficient reflectance. A thickness exceeding the upper limit of the range provides no further improvement in reflectance, and is rather unfavorable in view of cost-effectiveness. Preferably, the reflective layer is formed by vapor phase growth processes such as sputtering or evaporation.

Protective Layer 6

The protective layer is provided to improve scratch resistance and corrosion resistance. Preferably, this protective layer is formed of various organic materials. However, particular preference is given to constructing the protective layer of a radiation-curable type compound or a composition thereof, which is cured with radiation such as electron beams or ultraviolet rays. The protective layer has usually a thickness of about 0.1 to 100 $\mu$m, and may be formed by ordinary processes such as spin coating, gravure coating, spray coating, and dipping.

Adhesive Layer

Adhesives that form the adhesive layer are not particularly critical, and so may be selected from hot-melt adhesives, ultraviolet-curing adhesives, cold-setting adhesives, tackifiers, etc.

EXAMPLE

The present invention will now be explained more specifically with reference to some examples thereof.

Example 1

The first dielectric layer 31, recording layer 4, second dielectric layer 32, reflective layer 5 and protective layer 6 were formed on a surface of a disk form of polycarbonate substrate 2 of 120 mm in diameter and 0.6 mm in thickness in the following procedure. The substrate 2 was also provided with grooves (of 0.74 $\mu$m in width, 65 nm in depth and 1.48 $\mu$m in pitch) by co-injection molding. In this way, an optical recording disk sample having such an architecture as shown in FIG. 3 was prepared.

The first dielectric layer 31 was of a double-layer structure comprising a dielectric lamina 1a contiguous to the substrate 2 and a dielectric lamina 1b contiguous to the recording layer 4. The dielectric lamina 1a was formed by a sputtering process in an Ar atmosphere, using a ZnS (85 mol %)—SiO$_2$ (15 mol %) as a target. The dielectric lamina 1b was formed by a reactive sputtering process in an Ar+N$_2$ atmosphere, using Si as a target. The dielectric laminae 1a and 1b were 65 nm and 20 nm in thickness, respectively.

The recording layer 4 of 23 nm in thickness was formed by a sputtering process in an Ar atmosphere. The composition of the recording layer was GeSb$_2$Te$_4$.

The second dielectric layer 32 having a thickness of 30 nm was formed by a sputtering process in an Ar atmosphere, using ZnS (50 mol %)—SiO$_2$ (50 mol %) as a target.

The reflective layer 5 was formed by a sputtering process in an Ar atmosphere. For the target, Al-1.7 at % Cr was used. The thickness of the reflective layer was 150 nm.

The protective layer 6 was formed by the spin coating of an ultraviolet-curing resin, and curing the resin by ultraviolet irradiation. Upon curing, the protective layer had a thickness of 5 $\mu$m.

The sample prepared in this way was initialized by means of a bulk eraser, and then placed on an optical recording medium-estimating device (operating at a wavelength of 638 nm and a numerical aperture NA of 0.6) to estimate their properties using 8–16 modulation signals having the following recording pulse pattern (with a minimum turnover space 3 T and a maximum turnover space 14 T).

Recording Pulse
Pulse Pattern: Pattern illustrated in FIG. 1, and FIG. 2.
Recording power (peak power): 11.0 mW.
Erase power (bias power 1): 5.0 mW.
Bottom power (bias power 2): 0.5 mW.

Under the aforesaid conditions, the linear velocity ($v_{OP}$) at which the jitters reached a minimum was found to be 7 m/s.

This sample was overwritten to write 14 T signals with 3 T signals. The linear velocity $v_{OW}$ for overwriting was 6 m/s at which the 3 T signals corresponded to 4.88 MHz and the 14 T signals to 1.03 MHz. At this time, the erasability of 14 T signals was 30 dB.

After storage for 100 hours in an environment of 80° C. and 80% RH, the sample was then found to have an optimum linear velocity of 6 m/s under the aforesaid conditions. The erasability of the 14 T signals recorded before storage was found to be 29 dB again at $v_{OW}$=6 m/s. At this time, the ratio $v_{OW}/v_{OP}$ has 0.86.

Comparative Example 1

The erasability after storage was measured following Example 1 with the exception that $v_{OW}$=7 m/s or $v_{OW}/v_{OP}$=1. The found erasability was 18 dB. In this comparative example, the linear velocity for recording before storage, too, was 7 m/s.

Example 2

An optical recording disk sample was prepared following Example 1 with the exception that $SiO_2$ was used as a target for the formation of the second dielectric layer 32.

For this sample, $v_{OP}$ was found to be 8 m/s under the same conditions as in Example 1. Assuming $v_{OW}$=6 m/s or $v_{OW}/v_{OP}$=0.75, then the erasability was measured. The found erasability was 29 dB.

After storage for 100 hours in an environment of 80° C. and 80% RH, the sample was then found to have an optimum linear velocity of 6 m/s under the aforesaid conditions. The erasability of the 14 T signals recorded before storage was found to be 28 dB again at $v_{OW}$=6 m/s.

Comparative Example 2

The erasability after storage was measured following Example 2 with the exception that $v_{OW}$=8 m/s or $v_{OW}/v_{OP}$=1. The found erasability was 17 dB. In this comparative example, the linear velocity for recording before storage, too, was 8 m/s.

Example 3

An optical recording disk sample was prepared following Example 1 with the exception that the second dielectric layer 32 was of a double-layer structure. The second dielectric layer 32 was composed of a dielectric lamina 2a contiguous to the recording layer 4 and a dielectric lamina 2b contiguous to the reflective layer 5. The dielectric lamina 2a was formed in the same manner as in the dielectric lamina 1a of Example 1 with the exception that it had a thickness of 5 nm. The dielectric lamina 2b was formed in the same manner as in the dielectric lamina 1b of Example 1 with the exception that it had a thickness of 25 nm.

For this sample, $v_{OP}$ was found to be 6.5 m/s under the same conditions as in Example 1. Assuming $v_{OW}$=6 m/s or $v_{OW}/v_{OP}$=0.92, then the erasability was measured. The found erasability was 30 dB.

After storage for 100 hours in an environment of 80° C. and 80% RH, the sample was then found to have an optimum linear velocity of 6 m/s under the aforesaid conditions. The erasability of the 14 T signals recorded before storage was found to be 29 dB again at $v_{OW}$=6 m/s.

Comparative Example 3

The erasability after storage was measured following Example 3 with the exception that $v_{OW}$=6.5 m/s or $v_{OW}/v_{OP}$=1. The found erasability was 18 dB. In this comparative example, the linear velocity for recording before storage, too, was 6.5 m/s.

Example 4

The first dielectric layer 31, recording layer 4, second dielectric layer 32, reflective layer 5 and protective layer 6 were formed on a surface of a disk form of polycarbonate substrate 2 of 120 mm in diameter and 0.6 mm in thickness in the following procedure. The substrate 2 was also provided with grooves (of 0.595 μm in width, 70 nm in depth and 1.19 μm in pitch) by co-injection molding. In this way, an optical recording disk sample having such an architecture as shown in FIG. 3 was prepared.

The first dielectric layer 31 was of a double-layer structure comprising a dielectric lamina 1a contiguous to the substrate 2 and a dielectric lamina 1b contiguous to the recording layer 4. The dielectric lamina 1a was formed by a sputtering process in an Ar atmosphere, using a ZnS (80 mol %)—$SiO_2$ (20 mol %) as a target. The dielectric lamina 1b was formed by a reactive sputtering process in an Ar+$N_2$ atmosphere, using Ge as a target. The dielectric laminae 1a and 1b were 160 nm and 20 nm in thickness, respectively.

The recording layer 4 of 16 nm in thickness was formed by a sputtering process in an Ar atmosphere. The composition of the recording layer was $Ge_2Sb_2Te_5$.

The second dielectric layer 32 having a thickness of 28 nm was formed by a sputtering process in an Ar+$N_2$ atmosphere, using ZnS (80 mol %)—$SiO_2$ (20 mol %) as a target.

The reflective layer 5 was formed by a sputtering process in an Ar atmosphere. For the target, Al-1.7 at % Cr was used. The thickness of the reflective layer was 200 nm.

The protective layer 6 was formed by the spin coating of an ultraviolet-curing resin, and curing the resin by ultraviolet irradiation. Upon curing, the protective layer had a thickness of 5 μn.

Figure 4:
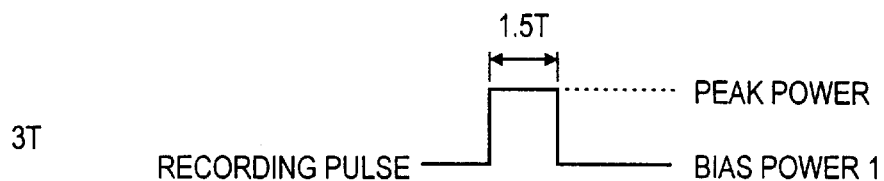
FIG. 4 is a graph illustrative of yet another modulation pattern for the laser beam used for the overwriting of the optical recording medium according to the invention.
Figure 5:
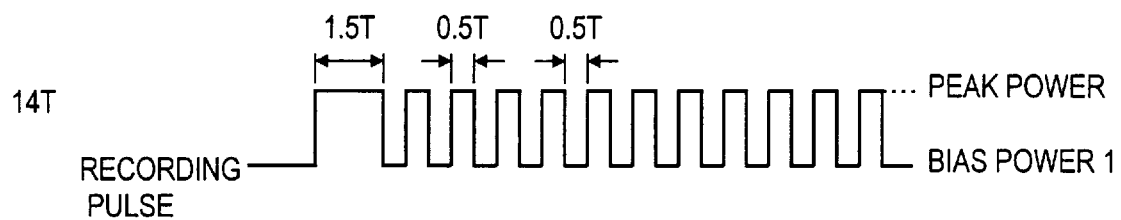
FIG. 5 is a graph illustrative of a further modulation pattern for the laser beam used for the overwriting of the optical recording medium according to the invention.

The sample prepared in this way was initialized by means of a bulk eraser, and then placed on an optical recording medium-estimating device (operating at a wavelength of 634 nm and a numerical aperture NA of 0.6) to estimate their properties using 8–16 modulation signals having the following recording pulse pattern (with a minimum turnover space 3 T and a maximum turnover space 14 T).
Recording Pulse
Pulse pattern: Pattern illustrated in FIG. 4, and FIG. 5.
Recording power (peak power): 9.0 mW.
Erase power (bias power 1): 4.0 mW.

Under the aforesaid conditions, the linear velocity ($v_{OP}$) at which the jitters reached a minimum was found to be 9 m/s.

This sample was overwritten to overwrite 14 t signals with 3 T signals. The linear velocity $v_{OW}$ for overwriting was 8.2 M/s. At this time, the erasability of 14 T signals was 29 dB.

After storage for 100 hours in an environment of 80° C. and 80% RH, the sample was then found to have an optimum linear velocity of 8 m/s under the aforesaid conditions. The erasability of the 14 T signals recorded before storage was found to be 26 dB again at $v_{OW}$=8.2 m/s. At this time, the ratio $v_{OW}/v_{OP}$ was 0.91.

Comparative Example 4

The erasability after storage was measured following Example 4 with the exception that $v_{OW}$=9 m/s or $v_{OW}/v_{OP}$=1. The found erasability was 22 dB. In this comparative example, the linear velocity for recording before storage, too, was 9 m/s.

Example 5

An optical recording disk sample was prepared following Example 4 with the exception that the first dielectric layer 31, second dielectric layer 32, and reflective layer 5 had the following structures. The first dielectric layer 31 had a composition of ZnS (80 mol %)—SiO$_2$ (20 mol %) and a thickness of 130 nm. The second dielectric layer 32 was of a double-layer structure composed of a dielectric lamina 2a contiguous to the recording layer 4 and a dielectric lamina 2b contiguous to the reflective layer 5. The dielectric lamina 2a was formed by a reactive sputtering process in an Ar+N$_2$ atmosphere, using Si as a target. The dielectric lamina 2b was formed by a sputtering process in an Ar atmosphere, using ZnS (80 mol %)—SiO$_2$ (20 mol %) as a target. The dielectric laminae 2a and 2b were 25 nm and 15 nm in thickness, respectively, and the reflective layer 5 was 100 nm in thickness.

For this sample, $v_{OP}$ was found to be 10 m/s under the same conditions as in Example 4 with the exception that the recording power (peak power) was 11.0 mW and the erase power (bias power 1) was 5.0 mW. At $v_{OW}$=8.2 m/s or $v_{OW}/v_{OP}$=0.82, the erasability was found to be 30 dB.

After storage for 100 hours in an environment of 80° C. and 80% RH, the sample was then found to have an optimum linear velocity of 8 m/s under the aforesaid conditions. The erasability of the 14 T signals recorded before storage was found to be 27 dB again at $v_{OW}$=8.2 m/s.

Comparative Example 5

The erasability after storage was measured following Example 5 with the exception that $v_{OW}$=10 m/s or $v_{OW}/v_{OP}$=1. The found erasability was 20 dB. In this comparative example, the linear velocity for recording before storage, too, was 10 m/s.

Example 6

An optical recording disk sample was prepared following Example 5 with the exception that the first dielectric layer 31, second dielectric layer 32, and reflective layer 5 had the following structures. The first dielectric layer 31 was of a double-layer structure composed of a dielectric lamina 1a contiguous to the substrate 2 and a dielectric lamina 1b contiguous to the recording layer 4. The dielectric lamina 1a was formed by a sputtering process in an Ar atmosphere, using ZnS (80 mol %)—SiO$_2$ (20 mol %) as a target. The dielectric lamina 1b was formed by a reactive sputtering process in an Ar+N$_2$ atmosphere, using Si as a target. The dielectric laminae 1a and 1b were 170 nm and 2 nm in thickness, respectively. In the second dielectric layer 32, the thicknesses of dielectric laminae 2a and 2b were 10 nm and 15 nm, respectively. The reflective layer 5 was 200 nm in thickness.

For this sample, $v_{OP}$ was found to be 11 m/s under the same conditions as in Example 5 with the exception that the erase power (bias power 1) was 4.5 mW. At $v_{OW}$=8.2 m/s or $v_{OW}/v_{OP}$=0.75, the erasability was found to be 31 dB.

After storage for 100 hours in an environment of 80° C. and 80% RH, the sample was then found to have an optimum linear velocity of 8 m/s under the aforesaid conditions. The erasability of the 14 T signals recorded before storage was found to be 27 dB again at $v_{OW}$=8.2 m/s.

Comparative Example 6

The erasability after storage was measured following Example 5 with the exception that $v_{OW}$=11 m/s or $v_{OW}/v_{OP}$=1. The found erasability was 19 dB. In this comparative example, the linear velocity for recording before storage, too, was 11 m/s.

From the examples and comparative examples given above, the effectiveness of the invention can be clearly understood. At $v_{OW}$=$v_{OP}$, the erasability at the first writing after storage at high temperatures becomes insufficient. By making $v_{OW}$ lower than $v_{OP}$, however, it is possible to prevent any erasability drop due to storage at high temperatures.

Japanese Patent Application No. 284445/1997 is herein incorporated by reference.

The structures and arrangements illustrated and described herein illustrate the principles of the invention. Modifications to the illustrated embodiments may be made without departing from the scope and spirit of the invention. Therefore, the present invention includes the subject matter defined by the appended claims and all reasonable equivalents.

What we claims is:

1. An optical recording medium comprising a substrate at least one dielectric layer and a phase change type recording layer, wherein: when said optical recording medium contains a recorded mark and is stored for at least 100 hours in a high temperature environment, an erasabilty of said recorded mark is at least 26 dB when said recorded mark is overwritten, and wherein overwriting takes place at a linear velocity $V_{OW}$ that satisfies the condition $$0.5 \leq V_{OW}/V_{OP} < 1$$

where $V_{OP}$ is an optimum linear velocity.

2. The optical recording medium according to claim 1, wherein said high temperature environment is 60 to 80° C.

3. The optical recording medium according to claim 1, which satisfies $$0.5 \leq v_{OW}/v_{OP} \leq 0.95$$

4. The optical recording medium according to claim 1, wherein said recording layer contains germanium, antimony and tellurium as main components.

5. The optical recording medium of claim 1, which comprises a substrate/first dielectric layer/recording layer/second dielectric layer/reflective layer/protective layer.

6. The optical recording medium of claim 1 in the shape of a disk.

7. The optical recording medium of claim 1, wherein overwriting satisfies the condition $0.7 \leq V_{OW}/V_{OP} \leq 0.95$.

8. The optical recording medium of claim 1, wherein the recording layer is composed of a material of the formula $Ge_aSb_bTe_{1-a-b}$, wherein $0.08 \leq a \leq 0.25$ and $0.20 \leq b \leq 0.40$.

9. The optical recording medium of claim 1, wherein the recording layer is composed of a material of the formula $[(In_aAg_bTe_{1-a-b})_{1-c}Sb_c]_{1-d}M_d$, wherein a=0.1 to 0.3, b=0.1 to 0.3, c=0.5 to 0.8 and d=0 to 0.10 and M represents at least one element selected from the group consisting of H, Si, C, V, W, Ta, Zn, Ti, Ce, Tb, Ge, Sn, Pb and Y.

* * * * *